United States Patent
Bellows

[15] 3,680,946
[45] Aug. 1, 1972

[54] COMPACT RANGEFINDING DEVICE

[72] Inventor: Alfred H. Bellows, Cambridge, Mass.

[73] Assignee: Polaroid Corporation, Cambridge, Mass.

[22] Filed: June 4, 1969

[21] Appl. No.: 830,402

[52] U.S. Cl. ..................350/10, 350/55, 350/27, 350/36, 350/174, 356/12
[51] Int. Cl. ..................................G02b 27/32
[58] Field of Search ..................350/102, 28–30, 350/36, 201, 55; 356/12–14

[56] References Cited

UNITED STATES PATENTS

| | | | |
|---|---|---|---|
| 3,481,658 | 12/1969 | Dietrich et al. | 350/10 |
| 1,985,067 | 12/1934 | Wandersleb | 356/12 |
| 2,425,713 | 8/1947 | Applegate | 356/12 |
| 2,960,907 | 11/1960 | Leitz | 350/29 X |
| 3,003,407 | 10/1961 | Grey | 350/29 X |
| 3,007,366 | 11/1961 | Gunther | 356/12 |
| 2,178,245 | 10/1931 | Schwarz | 350/9 |

FOREIGN PATENTS OR APPLICATIONS

| | | | |
|---|---|---|---|
| 169,036 | 10/1959 | Sweden | 356/12 |
| 724,624 | 2/1955 | Great Britain | 38/27 |

*Primary Examiner*—David Schonberg
*Assistant Examiner*—Toby H. Kusmer
*Attorney*—Brown and Mikulka, William D. Roberson and James L. Neal

[57] ABSTRACT

A compact viewing device permits observation of a field of view and superimposes thereon a virtual image of a reticle. The device includes a concave light reflecting surface transecting a line of sight extending from an observer into the field of view and a second mirror transecting the line of sight, the distance along the line between the mirrors being less than the focal length of the concave mirror. The reticle is positioned so that the second mirror directs light from the reticle to the concave mirror along a path which may substantially equal the focal length of the concave mirror. The concave mirror then focuses and redirects the light to the observer to form the virtual image of the reticle.

The viewing devices are usable in pairs to form a binocular viewfinder producing a composite virtual image resulting from two distinct left and right eye images. The reticles are movable for causing variation in the apparent position in the field of view of the composite image.

2 Claims, 6 Drawing Figures

PATENTED AUG 1 1972 3,680,946

INVENTOR.
ALFRED H. BELLOWS

BY Brown and Mikulka
and
James L. Neal
ATTORNEYS

PATENTED AUG 1 1972 3,680,946

INVENTOR.
ALFRED H. BELLOWS

BY Brown and Mikulka
and
James R. Peal
ATTORNEYS

COMPACT RANGEFINDING DEVICE

SUMMARY OF THE INVENTION

The invention involves a compact viewing device for superimposing a reticular image upon a field of view. The viewing device is provided with a viewing window for permitting observation of a field of view along a line of sight. A concave partially reflecting surface is positioned along the line of sight with its concavity facing the window and is spaced from the window by a distance less than the focal length of the concave surface. A reticle for producing the aforesaid reticular image is offset laterally from the line of sight. Another reflecting surface transects the line between the window and the concave partially reflecting surface and is positioned with respect to the concave reflecting surface and the reticle so that it directs illumination from the reticle to the concave reflecting surface. Stated differently, the optical axis of the concave reflecting surface is bent by the other reflecting surface. The concave surface focuses illumination from the reticle and reflects a portion thereof through the window to the observer eye position. The result is a virtual image of the reticle in superposition upon the field of view.

This construction provides a viewing device wherein the total thickness along the line of sight is independent of the focal length of the concave mirror. Substantial dimensional compaction along the aforesaid line of sight may thus be obtained in that the window and the concave mirror may be as close to each other along the line of sight as the presence of the other mirror will permit.

In one apparatus constructed according to this invention, a pair of the viewing devices comprise left and right eyepieces of a binocular rangefinder. Left and right reticular images are superimposed upon the field of view by the left and right eyepieces respectively. The images are observable as a composite image at a particular ocular convergence, the apparent position of the composite image being a function of the ocular convergence angle. The reticles are movable to vary the ocular convergence at which the composite image is observable, thereby to vary the apparent position of the composite image in the field of view.

It is a primary object of this invention to provide a viewing device having a relatively small dimension along its line of sight.

It is also an object to provide a viewing device characterized by a small dimension along its line of sight for permitting observation of a filed of view and superimposing a virtual image of a reticle upon the field of view.

DETAILED DESCRIPTION OF THE DRAWINGS

The viewing device of this invention permits observation of a field of view and superimposes a virtual image of a reticle upon the field of view. The reticle may be of any configuration which provides the desired virtual image. For example, the reticle may be configured as a frame to define a field of view or a portion thereof, or it may be configured as an arrow to aid in a ranging operation.

Figure 1:
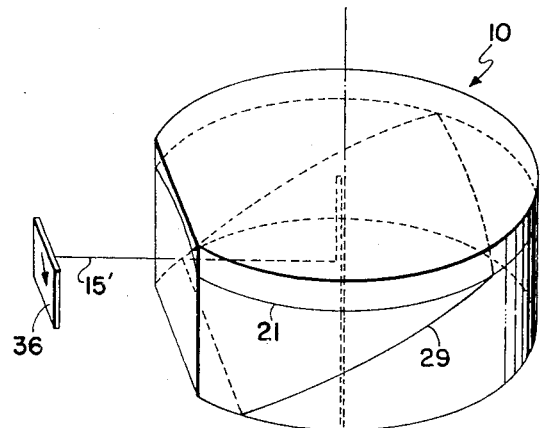
FIG. 1 is a perspective view showing a preferred embodiment of this invention.
Figure 2:
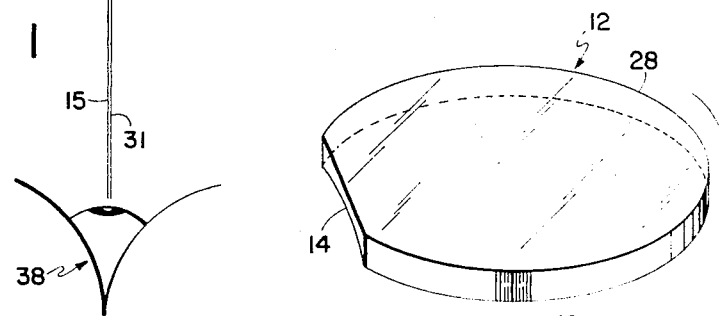
FIG. 2 is an exploded perspective view of the device illustrated in FIG. 1.
Figure 2:
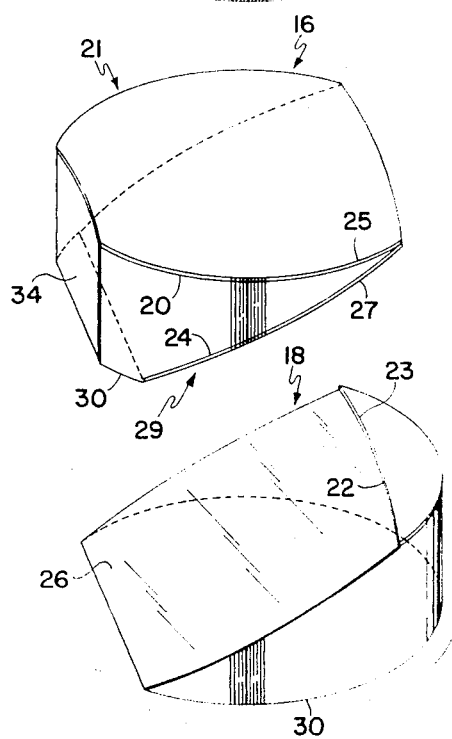

Reference should be had to FIGS. 1 and 2 In the preferred embodiment, device 10 comprises front optical element 12 having rearwardly directed concave surface 14 defining by its axis of rotational symmetry optical axis 15. The axes are collinear. A pair of optical elements 16 and 18 form the rear of device 10. Elements 16 and 18 include, respectively, forwardly directed convex surfaces 20 and 22 which conform to the shape of concave surface 14 and complementary plane surfaces 24 and 26. The rear elements are positionable contiguous each other and element 12 to form a cylindrical solid having window 34 formed along the side of element 16 in opposition to plane surface 24 and parallel to optical axis 15. Surfaces 24 and 26 form an oblique interface intersecting optical axis 15 at an angle of 45° between surface 14 and its focal point. Surfaces 20 and 22 from a single convex surface which complements surface 14 so that when elements 12, 16 and 18 are assembled a spherical interface is formed between element 12 and elements 16 and 18. Surfaces 20, 22 and 24 have applied thereto partial silver coatings 25, 23 and 27, respectively. These coatings are applied by any suitable method known in the art. The partial silver coating of surfaces 20 and 22 forms concave partially reflecting mirror 21 at the interface between elements 12 and 16 and 18. The partial silver coating of surface 24 forms plane partially reflecting mirror 29 at the interface between elements 16 and 18. In the preferred embodiment the silver coatings reflect substantially half the light incident thereon and permit the other half to pass.

Mirror 29 transects optical axis 15 at substantially at 45° angle between mirror 21 and its focal point. Illumination from reticle 36 is to be directed toward mirror 29 along a path normal to optical axis 15. Mirror 29 is situated for directing the portion of light incident thereon and reflected thereby toward concave mirror 21.

Elements 12, 16 and 18 are secured to each other in the desired relationship by the use of a suitable optical cement. For example, the optical cement may be Canada Balsam, a natural resin which solidifies into a transparent mass. The resulting device 10, in the form of a compact, generally cylindrical solid, permits light to enter the side of the device through window 34 without being refracted. The cylindrical surface forming the side portion not including window 34 is preferably covered with an opaque shield to prevent other light from entering the cylindrical surface.

The cylindrical solid surface defines plane end surfaces 28 and 30, termed light entrance and exit windows respectively. The forward surface of element 12 forms window 28. Light exit window 30 comprises the plane end portions of elements 16 and 18 which oppose convex surfaces 20 and 22 thereof. Entrance and exit windows 28 and 30 define line of sight 31 which extends from the observer into the field of view. In the preferred embodiment herein described this line of sight 31 is collinear with optical axis 15 concave mirror 21 is formed on surfaces 20 and 22 which are complementary to surface 14, therefore its axis can be represented by optical axis 15, too.

The arrangement described above yields an optical viewing device characterized by a compact dimension along line of sight 31. Plane partially reflecting mirror 29 effectively bends optical axis 15 defined by concave mirror 21 to define axis 15'. Light reflected by mirror 29 passes along axis 15' and light not reflected by mirror 29 passes therethrough along axis 15. Reticle 36 is located laterally of line of sight 31 along bent axis 15' a distance from concave mirror 21 less than or equalling the focal length of mirror 21. The distance along line 31 between mirror 21 and mirror 29, and therefore between entrance and exit windows 28 and 30, is rendered independent of the focal length of mirror 21. The minimum dimension of device 10 along the line of sight 31 is determined only by the space required to accommodate concave mirror 21 and adjacent plane mirror 29. The device may thus be exceedingly thin whereby it may be enclosed in a compact housing.

In use, reticle 36 is illuminated by a light source, not shown in FIGS. 1 or 2, and the device is supported with light exit window adjacent observer eye position 38.

Figure 3:
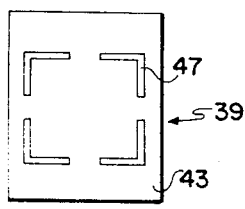
FIG. 3 illustrates a reticular configuration usable with the device of FIG. 1.
Figure 4:
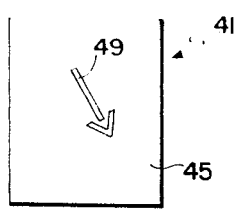
FIG. 4 illustrates another reticular configuration usable with the device of FIG. 1.

Light from reticle 36 enters the device 10 through the window 34 and impinges on the partially reflecting mirror 29 which reflects it forward to the concave partial mirror 21. The concave partial mirror focuses and reflects approximately one-half the light from reticle 36 backwards through the partial mirror 29 to the observer. The concave partial mirror 21 forms a virtual image of the reticle, using the light from the reticle because it is an optical distance from the concave mirror 34 less than or equalling its focal length. The observer perceives this image to be located some distance forward of the eyepiece along line of sight 31. When the reticle is located at the focal point the virtual image appears in focus at infinity; location of the reticle between such focal point and mirror 21 causes the reticle image focus to vary so that the image appears in focus nearer the subject. Therefore the locus at which the image appears in focus, in superposition upon the field of view, varies as the reticle is moved along axis 15' between mirror 21 and its focal point. FIGS. 3 and 4 illustrate two reticular configurations usable with the viewing device of this invention. Reticle 39 comprises plate 43 forming aperture 47. Reticle 41 comprises plate 45 forming aperture 49.

Reticle 39 is configured to frame a portion of the field of view in a manner appropriate for photographic applications. For example, the viewing device of this invention may be installed upon a photographic camera so that when a photographer observes the field of view through the viewing device the virtual image resulting from the apertures of reticle 39 frames the field of view or a portion thereof. The reticle may be calibrated so that a subject's face is framed when the subject is a predetermined distance from the observer.

Reticle 41 is configured to form an image of an arrow in superposition upon the field of view. The arrow image may designate a given distance from the observer. Device 10 may thereby be useful as rangefinding apparatus.

A BINOCULAR RANGING APPARATUS

Figure 5:
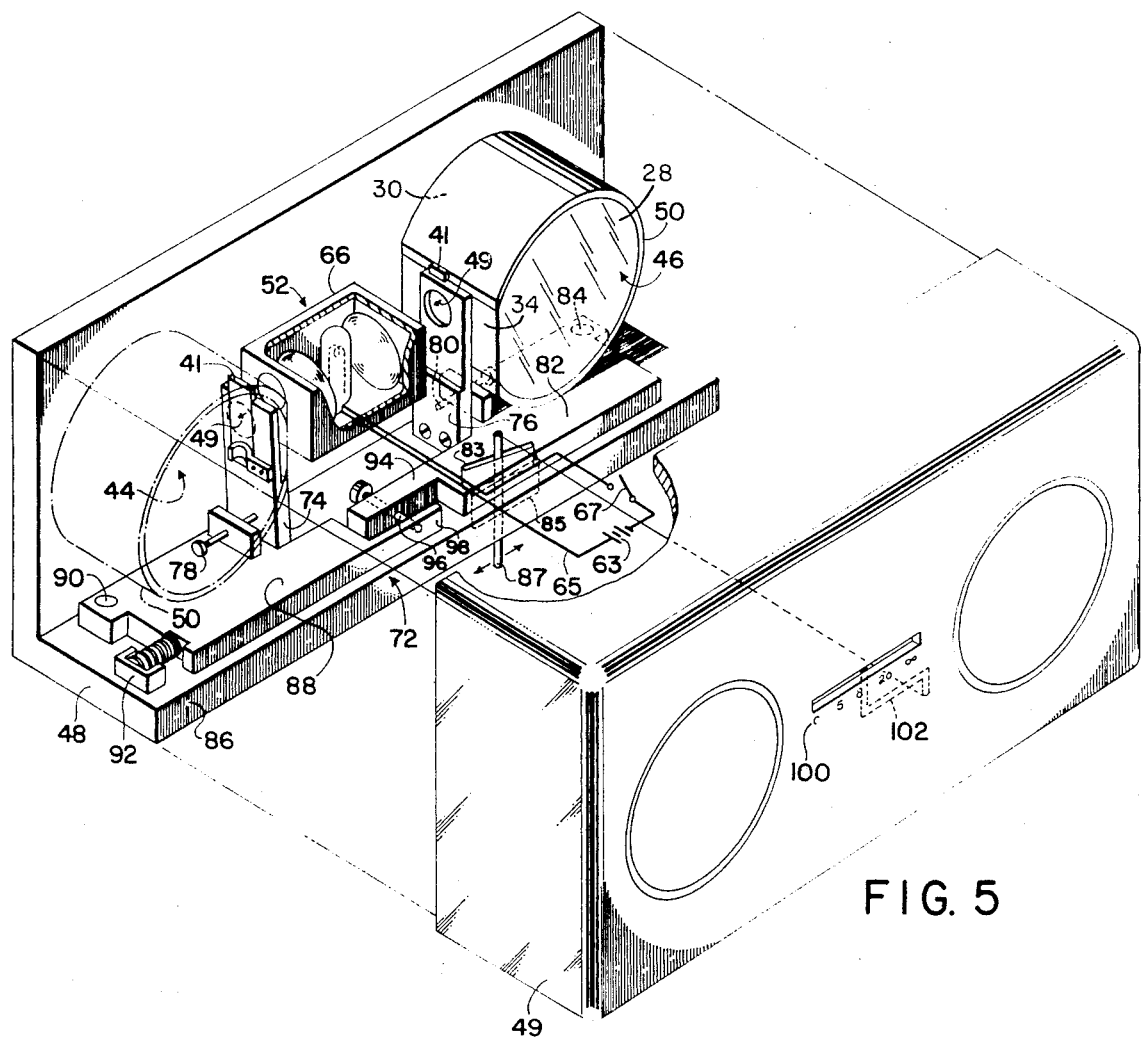
FIG. 5 is a perspective view showing ranging apparatus constructed according to this invention.

The viewing devices of this invention are usable in pairs to provide a binocular rangefinder which is dimensionally compact along its line of sight and which may be adapted for use with a photographic camera. A preferred embodiment is illustrated in FIG. 5 wherein binocular rangefinder 43 includes two devices 10 positioned to form left and right eyepieces 44 and 46 respectively. Eyepieces 44 and 46 are mounted upon support means 48. Housing 49 encloses the apparatus.

Eyepieces 44 and 46 are constructed in accordance with device 10, as describe above. Opaque mask means 50 covers the cylindrical surface of the eyepieces, leaving exposed only light entrance and exit windows 28 and 30 and flat window 34, the eyepieces being mounted so that windows 34 face each other. Reticle means 52 is situated between the eyepieces for directing illumination to both surfaces 34. The eyepieces are positioned so that axes 15 are substantially parallel and spaced apart by a distance equaling a preselected interocular distance of the average observer.

Figure 6:
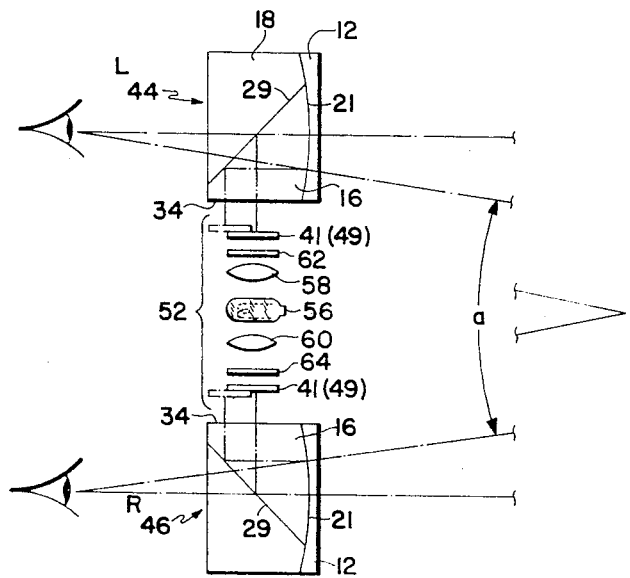
FIG. 6 is a schematic view illustrating the apparatus of FIG. 5.

Refer to FIG. 6. Reticle means 52 comprises a pair of reticles 41, lamp 56, a pair of condenser lenses 58 and 60, a pair of diffusers 62 and 64 and housing for enclosing and supporting the lamp, the lenses and the diffusers. Lamp 56 is electrically connected to source of electrical energy 63 through circuit 65 and switch 67. Reticle means 52 projects a light pattern from reticles 41 toward the flat windows 34 of eyepieces 44 and 46, respectively. One reticle is illuminated by light from lamp 56 which passes through lens 58 and diffuser 62 and thereafter impinges upon plane mirror 29 of eyepiece 44. The other reticle is illuminated by light from lamp 56 which passes through lens 60 and diffuser 64 and thereafter impinges upon plane mirror 29 in eyepiece 46. Light from the reticles is directed from the plane mirror of each eyepiece forwardly to concave partially reflecting mirror 21 of each eyepiece. The concave mirrors focus the light, forming images of the reticles, and reflect the light rearwardly toward the eyes of the observer to form left and right virtual images of the left and right reticles as described above in connection with FIGS. 1 and 2. The left image is observable by the left eye while the right image is observable by the right eye.

A composite virtual image superimposed upon the field of view results from a natural reaction of the observer's nervous system which is to alter the ocular convergence, represented by angle ($a$) in FIG. 6, at which the left and right eye images are viewed and, thus, the apparent separation of the images, in search of an angle at which the images appear to coincide. When apparent coincidence of the images is achieved, the left and right eye images are interpreted by the observer's nervous and visual sensory systems as a single composite image superimposed upon the field of view. The apparent locus of the composite image along a line of sight extending from the observer into the field of view is therefore a function of the ocular convergence at which the composite image is observable. Accordingly, the apparent locus of the composite image is variable in accordance with variation in the ocular convergence angle at which the individual images are observable.

The system is satisfied when both eyes are converged on on object in the field located at the vertex of the ocular convergence angle at which the virtual images of reticles 41 are observable as a single composite image. The apparent position of the composite image and the position of the object are the same. Ranging information is obtainable about the object when this condition is attained, as will be understood from the following.

Reticles 41 are movable supported by means 72 for varying the convergence angle ($a$) at which virtual images thereof are observable and for varying the image focus in accordance with variation in the convergence angle.

Means 72 is illustrated in FIG. 5 and comprises upstanding supports 74 and 76 for the pair of reticles 41. Each reticle is movable relative to one of the eyepieces along its bent optical axis 15' between the focal point of its mirror 21 and a locus along the bent axis 15' nearer mirror 21 than the focal point, while also moving the reticles transverse to the bent axis 15'. The precise operating position of reticles 41 relative to plate 88 and 82 may be determined by means of adjustment screws 78 and 80. Support 76 extends from plate 82 which is pivotally mounted by pin 84 to base 86. Support 74 extends from plate 88 which is pivotally mounted by pin 90 to base 86. Plate 82 includes extension 94 having contact point 96, which contact point, in the preferred embodiment, takes the form of a screw so that the system may be adjustable. Plate 88 includes extension 98 for cooperation with contact point 96.

Plate 82 defines cam slot 83 and base 86 defines cam slot 85. The cam slots receive pin 87 which is movable linearly to provide an input for producing counterclockwise rotation of plate 82 about pin 84. Plate 88 is biased for counterclockwise movement about pin 90 by spring means 92. Movement of pin 87 to the left as viewed in FIG. 5 rotates plate 82 counterclockwise and, by means of the contact point, causes plate 88 to rotate clockwise, rotation of the plates occuring in opposiion to the bias of spring means 92. Movement of pin 87 to the right permits spring 92 to rotate plate 88 counterclockwise which in turn causes plate 82 to be rotated clockwise. Pin 87 may be operated manually or mechanically. In photographic camera applications it may be operative in response to camera focus adjustments.

Since plates 82 and 88 are pivoted, a compound motion of reticles 41 occurs. As seen in FIG. 6, one component is normal to bent optical axes 15' of the eyepieces and the other component is a motion along these optical axes. A small change in the angular orientation of reticles 41 occurs but it is so small that its effect upon the position of apertures 49 relative to the eyepieces is negligible.

Movement of the reticle along a line normal to the bent optical axis 15' controls variation in the convergence angle, thereby to controllably vary the apparent position in the field of view of the composite virtual image. Movement of the reticle along bent axes 15' variably focuses the images of the reticles so they are always sharply in focus at the apparent position of the composite image.

The desirability of varying focus in conjunction with variation in the convergence angle arises due to the manner in which the eye normally functions. When we look from a distant object to a nearby object, we not only converge our gaze by rotating our eyeballs within their orbits, but we also accommodate the image by contracting the ciliary muscles surrounding the lens. In the normal eye, these two functions are coupled together. Thus, in the binocular rangefinder, if we place the reticle on an object a few feet away, we not only expect its convergence to match that of the object, but we expect its focus to be the same. Therefore, if the focus of the reticle is fixed at infinity, the rangefinder may be psychologically difficult to use, particularly at very close distances.

OPERATION OF THE BINOCULAR RANGEFINDER

The rangefinder is directed toward the scene and the scene is viewed through the eyepieces 44 and 46. The left eye views the scene through left eyepiece 44 and the right eye views the scene through right eyepiece 46.

Switch 67 is closed for igniting lamp 56 and light from the lamp passes through collimating lenses 58 and 60, through diffusers 62 and 64 and falls upon reticles 41. Plates 45 block all illumination from the lamp except that passing through apertures 49 so that light from the reticles bears the arrow configuration of the apertures. Light from the reticles provides left and right virtual images for producing an observable composite arrow image, as described above.

When the apparatus is ranged at infinity, the ocular convergence angle is substantially 0°. The individual lines of sight through each of the eyepieces are thus substantially parallel and the apparent position of the composite image in the field of view will be at infinity. As the apparatus is ranged upon a near subject, the convergence angle is caused to increase and the apparent position in the field of view of the virtual image will advance toward the observer, to the position of the near subject. For example, when ranging from a relatively far subject to a relatively near subject, pin 87 is moved to the left for moving reticles 41, substantially normal to bent optical axes 15' toward the observer while simultaneously moving the reticles in a direction parallel to bent optical axes 15' toward plane mirrors 29. The aforesaid normal movement reduces the convergence angle to thereby cause the composite virtual image to advance toward the observer in the field of view. The aforesaid movement parallel to the bent optical axis reduces the optical path length between the reticle to the concave mirror 21 and thereby causes the virtual image to be focused relatively near the camera. Movements normal and parallel to bent axes 15' are coordinated such that the point of conversion and the point of focus always coincide.

The provision by which reticle image focus is varied also serves to compensate for ranging inaccuracies which tend to arise due to variation in the interocular distance of various users of the rangefinder. The potential inaccuracy and compensation therefor occur in this manner. The variable distance binocular rangefinder is adjustable for distance by making gross changes in the ocular convergence angle at which the two virtual images formed in front of each eye respectively are observable. However, this gross change is precisely correct for one preselected eye spacing only. For people with smaller or greater interocular distances there will be a ranging error unless their gross ocular convergence angle is slightly modified. This is readily understood if the interocular distance is considered the base of a triangle having its apex at the virtual image, wherein the distance between the base and the apex is the distance being ranged. Obviously if the base is changed, the angle at the apex (i.e. the convergence angle) must change if the position of the apex is to remain fixed.

This compensating modification in the convergence angle is proportional to the person's deviation from the preselected eye spacing and inversely proportional to the apparent distance to the virtual image. The method of accomplishing this compensation is to move the reticles so that rays from the reticle diverge toward the observer eye positions in such a way that users with different interocular distances pick up rays with different and corresponding convergence angles. This divergence of the rays from the reticle corresponds exactly to a virtual image which has been focused for the same distance at which the gross convergence angle is set. Thus, if both convergence and focus of the virtual image are adjusted in concert, variations in eye spacing will not result in ranging error.

The above described apparatus thus provides a rangefinder wherein a selected subject can be brought into range by adjusting the reticular position until the composite virtual image of the reticle appears to be situated along a line of sight extending from the observer into the field of view, in the same plane as the subject. In photographic applications, this condition can indicate that the camera is correctly focused upon the selected subject.

An absolute measure of the distance from the observer to the subject may be obtained in any suitable manner. One manner resides in measuring the angular movement of plates 82 or 88 occuring as reticles 41 are moved. Since a movement of the reticles causes change in the ocular convergence angle, angular movement of the plates corresponds to change in the convergence angle and thus to change in the apparent position of the composite virtual image along the line of sight. For example, a scale 100 calibrated according to distance may be provided on housing 49 and extension 102 of pin 87 forms an indicator movable movable according change in the convergence angle.

It should be understood that terms "counterclockwise," "clockwise," "front," "rear," "left," "right" and the like are used only for purposes of discussion in connection with the drawings.

Since certain changes may be made in the above apparatus without departing from the scope of the invention herein involved, it is intended that all matter contained in the above description or shown in the accompanying drawings shall be interpreted as illustrative and not in a limiting sense.

I claim:
1. A rangefinder comprising:
   a left eyepiece forming entrance and exit windows spaced along a left line of sight;
   a right eyepiece forming entrance and exit windows spaced along a right line of sight;
   a partially reflecting, partially transparent spherical mirror within each of said eyepieces, said spherical mirrors being concave toward said exit windows;
   a partially reflecting, partially transparent planar mirror within each of said eyepieces, adjacent said spherical mirror and between said spherical mirror and said exit window, said planar mirrors positioned to reflect light emanating from a location between said left and said right eyepieces into said concave spherical mirrors;
   a left eye reticle between said left and right eyepieces and proximate said left eyepiece;
   a right eye reticle, between said left and right eyepieces and proximate said right eyepieces, said left and right eye reticles representing left and right eye perspective views, respectively, of an indicia whose image appears superimposed on the field of view seen through said eyepiece;
   light means, between said reticles, for illuminating said reticles in a manner that directs the illumination into the respective eyepieces;
   means for moving said reticles in a manner that changes the apparent location of their images in the field seen through said eyepieces in such a way that an observer looking through the eyepieces fuses the images of the indicia and perceives the indicia to advance and retreat according to the operation of said moving means.

2. The rangefinder described in claim 1, further comprising:
   a transparent plate with a concave surface for supporting said partially reflecting, partially transparent spherical mirror;
   a first transparent wedge with one planar surface having thereon said partially transparent, partially reflective planar mirror and one convex spherical surface, conforming to said concave surface, and a receiving window in the base of said transparent wedge for admitting light from said light means into said first transparent wedge; and
   a second transparent wedge with two planar surfaces, said first transparent wedge joined to said transparent plate with said convex surface nesting in said concave surface and said second transparent wedge joined to said first transparent wedge, the apex of one proximate the base of the other.

* * * * *